Oct. 1, 1963 W. HERMES 3,105,942

AUTOMATIC GAIN CONTROL AMPLIFIER SYSTEM

Filed Dec. 7, 1959

INVENTOR

WILLEM HERMES

BY Frank R. Jeifari

AGENT 3,105,942

AUTOMATIC GAIN CONTROL AMPLIFIER SYSTEM

Willem Hermes, Hilversum, Netherlands, assignor to North American Philips Company, Inc., New York, N.Y., a corporation of Delaware Filed Dec. 7, 1959, Ser. No. 857,735
Claims priority, application Netherlands Dec. 12, 1958
8 Claims. (Cl. 330—28)

This invention relates to a level-control arrangement for signals accompanied by a pilot signal, which arrangement comprises an amplifier and an AGC-circuit which serves for level control and is in the form of a pilot receiver provided with an amplitude detector, the input of this AGC-circuit being connected to the output of the amplifier while the amplifier is provided with a thermistor the value of which is controlled for gain control by a level-control voltage taken from the output of the AGC-circuit.

For several applications, in particular for level control in carrier wave telephony systems, such level control systems have to satisfy exacting technical requirements, for in a highly sensitive level control, in which, for example, variations of the input level must be reduced from 8 db to 0.2 db, it is required that any influence of interference signals upon the level control should be materially reduced, while furthermore a high reliability is required so that, for example, excessive pilot level variations do not greatly interfere with the operation of the level control system or even cause the thermistor to burn out.

It is an object of the present invention to provide a transistorized level-control arrangement in which the aforesaid requirements are readily satisfied.

A level-control arrangement is accordance with the invention is characterized in that it is provided with a control transistor in common collector arrangement, to the base of which the output voltage of the AGC-circuit is applied, and with an auxiliary transistor in common emitter arrangement which, in the level-control range, is rendered highly conductive by means of a supply current supplied to the base through a supply resistor, the emitter of the control transistor being connected to the collector of the auxiliary transistor while, in order to control the base supply votlage of the auxiliary transistor, the collector electrode of the control transistor is connected to a tapping on the supply resistor connected to the base of the auxiliary transistor, the thermistor, which is included in the amplifier circuit and is controlled by the level-control voltage, being connected in the emitter circuit of the auxiliary transistor.

In order that the invention may readily be carried out, two embodiments thereof will now be described, by way of example, with reference to the accompanying diagrammatic drawings, in which.

Figures 1, 2, 3:
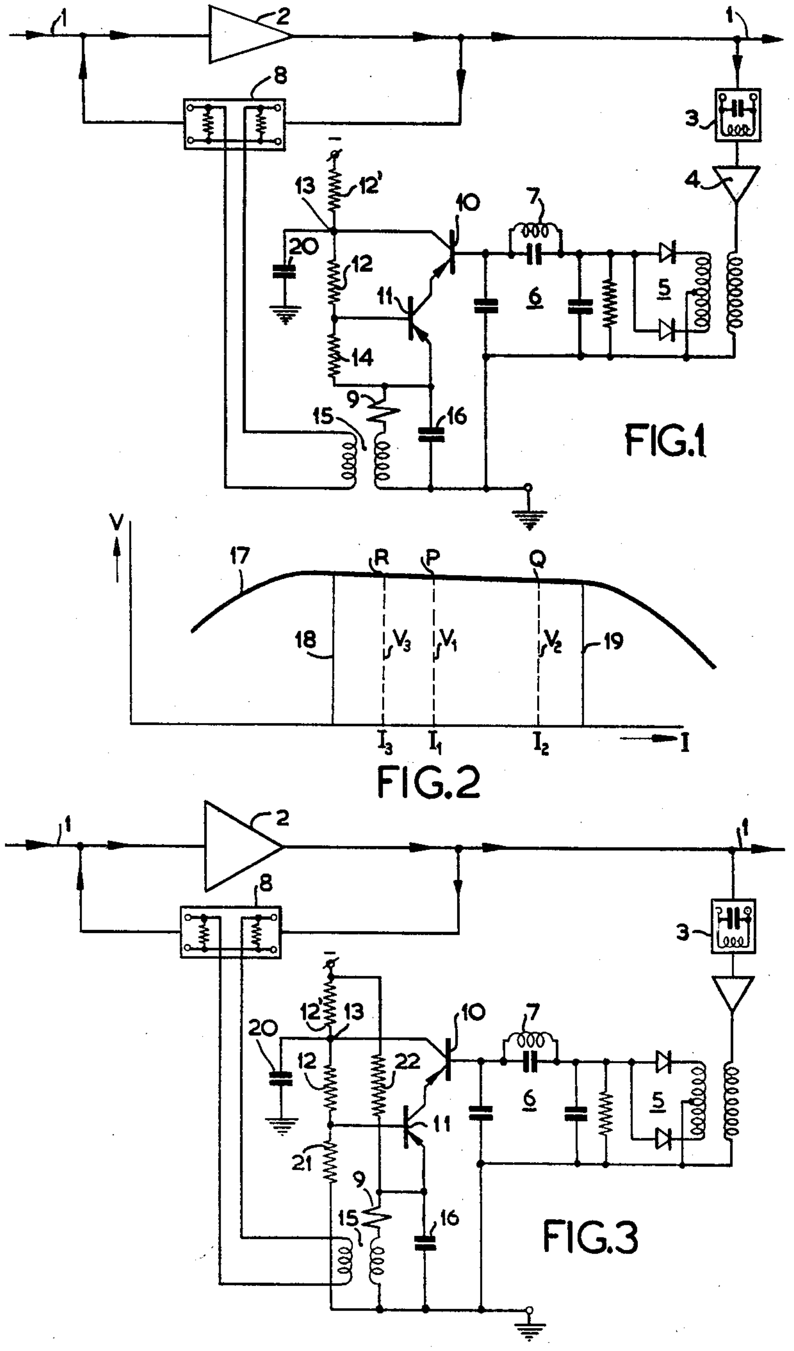
FIG. 1 shows a level-control system in accordance with the invention.
FIG. 2 is a voltage diagram illustrating the operation of the level-control device in accordance with the invention.
FIG. 3 shows a preferred embodiment of an arrangement in accordance with the invention.

The level-control arrangement in accordance with the invention shown in FIG. 1 for controlling the level of signals accompanied by a pilot signal forms part of an amplifier station in a transistorized carrier wave telephony system, the transmitted signals being supplied, through a transmission cable 1, to an amplifier 2. The carrier wave telephony system is designed, for example, for the transmission of carrier wave telephony signals in the bands of from 60 to 108 kc./s. and of a pilot signal at 84 kc./s. serving for level control.

To the output circuit of the amplifier 2 there is connected an AGC-circuit which serves for level control and comprises a pilot receiver which contains, in succession, a pilot filter 3, a pilot amplifier 4 and a push-pull amplitude detector 5 provided with an output filter 6 having a rejector circuit 7 in the series branch of the output filter 6 for rejecting the ripple voltage produced in the push-pull rectification. By rectification of the pilot signal there is produced at the output circuit of the push-pull rectifier 5 a level-control direct voltage which serves for level control and controls a thermistor 9 having a negative temperature coefficient and connected in a negative feedback circuit 8 of the amplifier 2, so that the level control is effected by controlling the negative feedback factor of the amplifier 2. As is shown in the figure, the thermistor 9 is connected in a series branch of a $\pi$-section of the negative feedback network 8.

According to the invention, the level-control arrangement is provided with a control transistor 10 in common collector arrangement, to the base of which the output voltage of the AGC-circuit is applied, and with an auxiliary transistor 11 which, in the level-control range, is rendered highly conductive by means of a supply current supplied to the base through a supply resistor 12, 12′, the emitter of the control transistor 10 being connected to the collector of the auxiliary transistor 11 while, in order to control the base supply voltage for the auxiliary transistor 11, the collector of the control transistor is connected to a tapping 13 on the supply resistor 12, 12′ connected to the base of the auxiliary transistor 11, the thermistor 9, which is included in the circuit of the amplifier 2 and is controlled by the level control voltage, being connected in the emitter circuit of the auxiliary transistor 11. In the arrangement shown, the base of the auxiliary transistor 11 is connected, through a resistor 14, to the emitter, while the thermistor 9 is coupled to the negative feedback circuit 8 of the amplifier 2 by means of a transformer 15 connected in series with the thermistor 9, the resulting series connection being shunted by a capacitor 16 which, for the signal frequencies in the band between 60 and 108 kc./s., has an impedance which is materially less than the resistance of the thermistor 9, so that for these frequencies the thermistor 9 is connected directly in parallel with the transformer 15.

For level control the control transistor 10 by means of current amplification acts as an energy amplifier for controlling the value of the thermistor 9 connected in the emitter circuit of the auxiliary transistor 11, while at the same time in the level-control range the voltage across the thermistor 9 is substantially equal to the level-control voltage produced by the push-pull rectifier 5, for in the level-control range the collector-emitter internal impedance of the auxiliary transistor 11, which transistor in this range is rendered highly conductive by the base supply voltage, is particularly low, for example from 5 to 10Ω. If, for example, in this range the amplitude of the pilot signal and hence the output voltage of the rectifier 5 increases, the power supplied to the thermistor 9, which power is given by the square of the current passing through the thermistor 9, also increases so that the thermistor resistance decreases with a resulting decrease in amplification, which decrease counteracts this increase in level. Conversely, if the amplitude of the pilot signal decreases, increase of the thermistor resistance produces an increase in amplification counteracting this decrease of the level.

The operation of the level-control arrangement described will now be described in detail with reference to the current-voltage characteristic of the thermistor 9 shown by a curve 17 in FIG. 2. The level-control range of the level-control arrangement is bounded by the boundaries indicated in the figure by lines 18 and 19 and, in the embodiments described, is, say, 8 db.

In this arrangement, the lower boundary 18 of the level-control device occurs when the control transistor 10 is cut off, the thermistor current and hence the thermistor resistance being determined by the value of the base supply resistor 12, 12′, while the upper boundary 19 of the control range is reached when the collector current of the control transistor 10 has increased in a degree such that the resulting decrease of the base current of the auxiliary transistor 11 causes this transistor 11 to be brought from its highly conductive condition to its normal operating range, for in this operating range the collector-emitter voltage of the auxiliary transistor 11 will start to increase so that a further increase of the emitter current is prevented. The two boundaries 18, 19 of the control range can be simply adjusted, the lower boundary 18 being adjusted by adjustment of the base supply resistor 12, 12′, while the upper limit is adjusted by adjustment of the tapping 13 or of a resistor 14 connected between the emitter and the base of the auxiliary transistor 11, which resistor may have a value of 140Ω. Owing to the level control range being determined, an excessive variation of the pilot signal cannot cause the thermistor 9 to burn out nor the level control system to be disabled, since the amplification factor of the amplifier 2 can vary by at most 8 db.

As will be explained more fully hereinafter, a level-control arrangement is obtained which is highly sensitive in the level-control range, for, if the thermistor is adjusted to a point P of its characteristic with an associated thermistor voltage $V_1$ and thermistor current $I_1$, an increase of the pilot level will cause a decrease in the thermistor resistance, which is given by the quotient of the voltage $V_2$ and current $I_2$ associated with the resulting operating point Q, while similarly with a decrease in the pilot level the thermistor resistance increases to a value determined by the quotient of the voltage $V_3$ and current $I_3$ of the resulting operating point R. Since the voltage of the thermistor 9 is determined by the voltage associated with the operating point on its characteristic and furthermore the thermistor voltage and the output voltage of the push-pull detector 5 are substantially equal to one another, the output voltage of the push-pull detector 5 is forced to follow the thermistor voltage. When the level control range is fixed in the manner described, the thermistor 9 being adjusted to the shown part of its characteristic, a sensitive level control is obtained in which, for example, level variations of 8 db are reduced to form 0.1 to 0.2 db. It should be remarked that the variation of the thermistor characteristic in the level-control range, which consists in that the thermistor voltage slightly decreases with increase in the thermistor current, acts in support of the achievement of a maximum control sensitivity, for it provides a compensation for the voltage drop produced in the path extending from the base of the control transistor 10 through its emitter, the collector and emitter of the auxiliary transistor 11 to the primary winding of the transformer 15, which voltage loss increases with increase in the thermistor current and, although it is very small, cannot be neglected to achieve maximum control sensitivity.

With respect to interference alternating voltages the level-control device behaves quite differently, for due to its internal inertia the thermistor resistance is not capable of following the interference alternating voltages and the thermistor 9 provides a considerable negative feedback for these interference alternating voltages which is hardly reduced by a capacitor 16 connected in the emitter circuit of the auxiliary transistor, since this capacitor offers a materially higher impedance to the interference frequencies than the thermistor resistance. The level-control device is influenced by the interference signals owing to the fact that the adjusted point of the thermistor 9 is varied by the power of these interference signals, for example, if in an excessive case the interference alternating current is 10% of the control direct current passing through the thermistor, this interference alternating current produces a variation of the adjusted point which corresponds to a variation of only ½% in the control direct current flowing through the thermistor. Thus, a great immunity from interference is achieved while owing to the very high negative feedback factor for the interference signals there is little likelihood of distortions in these interference signals which might contribute to the level-control direct current.

For level-control arrangements, this high immunity from interference provides an important additional advantage, for consequently the cut-off frequency of the low-pass filter 6 connected in the output circuit of the push-pull detector 5 can be raised and hence the time constant of the low-pass filter 6 can be reduced, so that the only element having a large time constant which is operative in the level control loop is the thermistor 9 and hence in the case of a pilot level variation the output signal of the amplifier 2, which signal is controlled in level, reaches its final position aperiodically without decay phenomena. Thus, the level-control system described provides not only a high reliability, an extremely sensitive level control and a great immunity from interference, but also ensures a stable output level without decay phenomena, which in practice are referred to as "jitter."

In the arrangement described, the contorl of the auxiliary transistor 11 is only slightly influenced by interference signals which reach the base electrode of the auxiliary transistor 11 through the collector circuit of the control transistor 10 and the base supply resistor 12, 12′, owing to the voltage division of the interference signals between the comparatively large base supply resistor 12 and the small resistor 14 connected between the base and the emitter of the auxiliary transistor 11. If desired, this influence can be further reduced by the connection to the junction 13 of the collector and the base supply resistor 12, 12′ of a smoothing capacitor 20 which reduces the amplification of the interference signals by the control transistor 10.

The following details are given of a level control device which was extensively tested in practice:

| | |
|---|---|
| Transistors 10, 11 | OC 76. |
| Thermistor | Miniature NTC-resistor. |
| Capacitor 16 | 0.1μf. |
| Capacitor 20 | 40μf. |
| Resistor 12′ | 820Ω. |
| Resistor 12 | 5600Ω. |
| Resistor 14 | 140Ω. |
| Transformation ratio | 15:1:1. |

A further practical advantage of the arrangement described is its high input impedance which is retained within and without the level-control range, for it enables the pilot level at the output of the push-pull detector 5 to be checked by means of a direct-voltage meter without the indications being interfered with by variations in the input impedance of the level-control arrangement.

FIG. 3 shows a preferred embodiment of a level-control arrangement in accordance with the invention, in which corresponding elements are designated by like reference numerals.

The arrangement shown in FIG. 3 differs from that shown in FIG. 1 in that the base of the auxiliary transistor is not directly connected to the emitter through a resistor 14, but in the arrangement of FIG. 3 this base is connected, through a resistor 21, to the end of the thermistor 9 more remote from the emitter. This resistor 21, which also must absorb the thermistor voltage of about 4 v., is considerably larger than, for example 30 times as large as, the resistor 14 connected in FIG. 1 between the base and the emitter, so that the control of the auxiliary transistor 11 is more sensitive with the result that temperature influences on the position of the operating point of the auxiliary transistor 11, which might result in the position of the upper boundary 19 of the level control range being shifted, are materially eliminated. In practice, it was found, for example, that when the transistor 11 was heated to about 80° C., the upper boundary of the level control range was changed by only a few percent.

It was found that interference signals reaching the base of the auxiliary transistor 11 through the collector circuit of the control transistor 10 substantially do not influence the control of this auxiliary transistor and this is due to the fact that, when the auxiliary transistor 11 is in its normal operating range, there is applied through the circuit: collector of the control transistor 10, base supply resistor 12 of the auxiliary transistor, collector circuit of the auxiliary transistor 11 to the emitter electrode of the control transistor 10, a considerable negative feedback voltage to the control transistor 10, which voltage materially reduces the influence of the interference signals.

With a very low sensitivity to temperature influences, the immunity from interference proves to be not less than that of the arrangement shown in FIG. 1.

A further important property of the arrangement described consists in that with a sudden comparatively large increase of the pilot level, the level control is delayed, for, if such a level increase occurs, owing to the base voltage of the auxiliary transistor 11 being controlled by the control transistor, the auxiliary transistor 11, which normally is rendered highly conductive, is brought to its normal operating range, so that, as compared with the arrangement shown in FIG. 1, the thermistor current can only increase gradually with a resulting gradual heating of the thermistor 9. Owing to this effect, the amplification of the amplifier 2 can only change gradually both with a decrease and with an increase of the pilot level, and this is of particular advantage to the stability of the system.

In the arrangement described, the lower boundary 18 of the level control range is adjusted by means of a resistor 22 connected between a supply terminal and the thermistor 9, while the upper boundary 19 is adjusted by adjusting the junction 13 of the collector of the control transistor 10 and of the base supply resistor 12, 12' of the auxiliary transistor 11.

The following details are given of the arrangement described, in which transistors and thermistors of the same type are used:

| | |
|---|---|
| Capacitor **16** | 0.1μf |
| Capacitor **20** | 40μf |
| Transformation ratio | 15:1:1 |
| Resistor **12'** | 560Ω |
| Resistor **12** | 7500Ω |
| Resistor **21** | 3900Ω |

Finally, it should be mentioned that the thermistor 9 need not be coupled to the negative feedback circuit 8 of the amplifier 2 by transformer coupling, but that use may also be made of choke or resistor coupling, in which event blocking capacitors must be used for direct-current separation.

What is claimed is:

1. A level control circuit for an amplifier of the type having thermistor gain control means and means providing an automatic gain control voltage, said circuit comprising a first transistor having first base, first collector, and first emitter electrodes, a second transistor having second base, second collector, and second emitter electrodes, means applying said automatic gain control voltage to said first base electrode, means connecting said first emitter electrode to said second collector electrode, a source of supply current having first and second terminals, said first terminal being connected to said second base electrode by way of supply resistor means to render said second transistor highly conductive in the level control range of said circuit whereby the base voltage of said second transistor varies with collector current of said first transistor, means connecting said first collector to a tap on said supply resistor mean, means connecting said thermistor means between said second emitter and second terminal, and output circuit means connected in parallel with said thermistor means.

2. The level control circuit of claim 1, in which a resistor is connected between said second base and second emitter electrodes.

3. In level control system for signals which include a pilot signal, said system being of the type including an amplifier connected to amplify said signals, pilot receiver means connected to the output circuit of said amplifier for providing an automatic gain control voltage, and thermistor means connected to control the gain of said amplifier, level control circuit means responsive to said automatic gain control voltage for controlling the current through said thermistor means and for limiting the maximum current flow through said thermistor means, said level control circuit means comprising a first transistor connected in common collector arrangement and having first base, first collector, and first emitter electrodes, a second transistor connected in common emitter arrangement and having second base, second collector, and second emitter electrodes, means applying said automatic gain control voltage to said first base electrode, means connecting said first emitter electrode to said second collector electrode, a source of supply current having first and second terminals, means connecting said first terminal to said second base electrode by way of supply resistor means to render said second transistor highly conductive in the level control range of said level control circuit means, means connecting said first collector electrode to a tap on said supply resistor means, and means connecting said thermistor means between said second emitter and second terminal.

4. The system of claim 3, in which a resistor is connected between said second base and second emitter electrodes.

5. The system of claim 3, in which one end of said thermistor means is connected to said second emitter electrode, wherein a resistor is connected between said second base and second terminal.

6. A level control circuit for an amplifier of the type having an input circuit and an output circuit, negative feedback means connected between said input and output circuits, and means providing an automatic gain control voltage, said control circuit comprising a first transistor having first base, first collector, and first emitter electrodes, a second transistor having second base, second collector, and second emitter electrodes, means applying said automatic gain control voltage to said first base electrode, means connecting said first emitter electrode to said second collector electrode, a source of supply current, said source of supply current being connected to said second base electrode by way of supply resistor means to render said second transistor highly conductive in the level control range of said circuit, means connecting said first collector to a tap on said supply resistor means, thermistor means, a transformer having a primary winding and a secondary winding, means serially connecting said thermistor means and primary winding in the emitter circuit of said second transistor, and means connecting said secondary winding to said negative feedback means to control the negative feedback of said amplifier.

7. The circuit of claim 6, in which said negative feedback means comprises a network having a pi section, and said secondary winding is connected in the series branch of said pi section.

8. A level control circuit for an amplifier of the type having thermistor gain control means and means providing an automatic gain control voltage, said circuit comprising a first transistor having first base, first collector, and first emitter electrodes, a second transistor having second base, second collector and second emitter electrodes, means applying said automatic gain control voltage to said first base electrode, means connecting said first emitter electrode to said second collector electrode, a source of supply current having first and second terminals, supply resistor means connected between said first terminal and said second base electrode, a tap on said resistor means connected to said first collector electrode, means providing a direct current path between said second emitter and said second terminal, said supply resistor having a value biasing said second transistor to a highly conductive state in the level control range of said control circuit, a temperature sensitive resistor, means for varying the temperature of said temperature sensitive resistor as a function of the current in said current path, said means for varying said temperature comprsing means for applying said current in heat transfer relationship with respect to said temperature sensitive resistor, and output circuit means connected in parallel with said temperature sensitive resistor.

References Cited in the file of this patent

UNITED STATES PATENTS

| | | |
|---|---|---|
| 2,188,671 | Wilson | Jan. 30, 1940 |
| 2,298,192 | Bollman | Oct. 6, 1942 |
| 2,361,593 | Black | Oct. 31, 1944 |
| 2,801,300 | Crane et al. | July 30, 1957 |
| 2,881,269 | Hanel et al. | Apr. 7, 1959 |

FOREIGN PATENTS

| | | |
|---|---|---|
| 567,879 | Belgium | June 14, 1958 |

OTHER REFERENCES

Article, "Transistor Audio Freq. Amplifier" by Aronson and Putzrath, RCA Technical Notes, RCA TN No. 36, August 9, 1957.